United States Patent [19]
Napolitano

[11] Patent Number: 6,132,375
[45] Date of Patent: Oct. 17, 2000

[54] MEDICAL ULTRASONIC SYSTEM AND METHOD FOR SYNTHETIC APERTURE PROCESSING IN ELEVATION

[75] Inventor: David J. Napolitano, Menlo Park, Calif.

[73] Assignee: Acuson Corporation, Mountain View, Calif.

[21] Appl. No.: 09/282,910

[22] Filed: Mar. 31, 1999

[51] Int. Cl.[7] .......................................... A61B 8/00
[52] U.S. Cl. ............................ 600/443; 600/447
[58] Field of Search ..................... 600/437, 443, 600/447; 367/7, 11, 88; 342/25, 26, 191, 368; 128/916

[56] References Cited

U.S. PATENT DOCUMENTS

| | | |
|---|---|---|
| 4,653,000 | 3/1987 | Matsumoto . |
| 4,784,147 | 11/1988 | Moshfeghi ............................. 600/407 |
| 4,841,489 | 6/1989 | Ozaki et al. . |
| 5,014,712 | 5/1991 | O'Donnell . |
| 5,465,722 | 11/1995 | Fort et al. . |
| 5,611,343 | 3/1997 | Wilson . |
| 5,902,241 | 5/1999 | Seyed-Bolorforosh et al. ....... 600/443 |

FOREIGN PATENT DOCUMENTS 0110 621 A2   6/1984   European Pat. Off. .

OTHER PUBLICATIONS

John C. Curlander et al., Synthetic Aperture Radar Systems and Signal Processing, 1991;.
Donald R. Wehner; High Resolution Radar; 1931; pp. 184–203;.

*Primary Examiner*—Marvin M. Lateef
*Assistant Examiner*—Ali M. Imam
*Attorney, Agent, or Firm*—Craig A. Summerfield, Esq.; Brinks Hofer Gilson & Lione

[57] ABSTRACT

Coherent data representing a plurality of two-dimensional regions that overlap as a function of the elevational beam width are obtained. The coherent data, such as in-phase and quadrature data, is filtered along an elevational dimension. The filtering adjusts the phase of the coherent data in the elevation dimension. Filtering effectively generates a Fourier transform of the coherent data along the elevational dimension, and adjusts the phase by multiplying by a spectral focusing function. Multiplying by the spectral focusing function results in a constant phase. The coherent data is then inversed Fourier transformed. This filtering narrows the elevation beam width associated with portions of each two-dimensional set of data. The filter varies as a function of the axial position of the coherent data. In particular, the elevation beam width for a linear transducer is wider near the transducer and beyond the elevational focal point, so the associated phase is more distorted at points more distant from the elevation focal point from the acoustic lens. The filter accounts for this axial varying distortion of the phase.

26 Claims, 2 Drawing Sheets

MEDICAL ULTRASONIC SYSTEM AND METHOD FOR SYNTHETIC APERTURE PROCESSING IN ELEVATION

BACKGROUND OF THE INVENTION

This invention relates to an ultrasound system and method for synthetic aperture processing. In particular, the system adjusts a beam width.

Ultrasound systems generate two-dimensional images representing a region of the subject under examination. Many ultrasound systems are capable of generating images representing three dimensions of a volume region of the subject under examination. The three-dimensional representations are generated from a plurality of frames of data associated with a respective plurality of two-dimensional regions.

Any of various transducers are used for transmitting and receiving acoustic energy for scanning a two-dimensional region. For example a linear transducer is used. A linear transducer includes a plurality of transducer elements spaced along an azimuth or lateral dimension. Acoustic energy is fired along a series of ultrasound lines that are electronically steered along the azimuth dimension. The ultrasound system samples data along each ultrasound line, defining an axial or range dimension. To obtain additional two-dimensional (i.e., azimuth and axial dimensions) images, the transducer is repositioned along the elevation dimension.

In the range-azimuth plane, resolution is a function of the temporal width of the two-way acoustic pulse (i.e., the axial resolution) and the lateral beam width at the point of interest within the two dimensions. Generally, the axial resolution is constant throughout the image. The lateral beam width or lateral resolution may be kept constant throughout the image by focusing and dynamically controlling the receive aperture, compensating for the fixed focus of the transmit beam.

For many transducers, the resolution associated with the elevation dimension is a function of the acoustic lens design or the surface shape of the PZT (i.e., mechanically focused wavefront). For example, the acoustic lens provides a fixed focal depth and elevation beam width as a function of the wavelength of the acoustic pulse. Due to the fixed focus, the resolution is better at the point of focus then at other axial positions, such as the near-field or far-field. For imaging, the elevational resolution undesirably varies as a function of the axial position within an image.

Using a 1.5 or a two-dimensional transducer, the elevation aperture and resulting elevation resolution may be electronically controlled. For example, the elevation aperture is controlled in a similar methodology as for the azimuthal aperture with a linear transducer. However, 1.5 and two-dimensional transducers are more costly and complicated.

In radar imaging, satellites or other radio frequency transmitters transmit beams to different locations within a grid to generate an image, such as an image of terrain. The transmitters act as a single or other limited element array. Multiple beams are transmitted for imaging a respective multiple points along the grid. To account for the small aperture size, synthetic aperture radar (SAR) processes were developed. The data received from the multiple transmissions is processed to account for the single element transmission. For example, the phase associated with multiple transmissions is adjusted.

SUMMARY

The present invention is defined by the following claims, and nothing in this section should be taken as a limitation on those claims. By way of introduction, the preferred embodiment described below includes a method and system for synthetic aperture elevation processing. Coherent data representing a plurality of two-dimensional regions that overlap as a function of the elevational beam width are obtained. The coherent data, such as in-phase and quadrature data, is filtered along an elevational dimension. Alternatively, in the frequency domain, multiplying by the spectral focusing function preferably results in a constant phase. The coherent data is then inversed Fourier transformed. This filtering narrows the elevation beam width associated with portions of each two-dimensional set of data.

The filter varies as a function of the axial position of the coherent data. In particular, the elevation beam width for a linear transducer is wider near the transducer and beyond the elevational focal point, so the associated phase is more distorted at points more distant from the elevation focal point. The filter accounts for this axial varying distortion of the phase.

In one embodiment, a method for processing ultrasound data in an elevation dimension is provided. At least first and second sets of coherent ultrasound data are generated, where each set of coherent ultrasound data defines axial and azimuthal dimensions. Each set of coherent ultrasound data is associated with a different elevation position. The coherent ultrasound data is filtered in an elevation dimension as a function of axial position.

In another embodiment, an ultrasound apparatus is provided for processing ultrasound data in an elevation dimension. A beam former is used to generate the sets of coherent ultrasound image data discussed above. A filter is provided for filtering the coherent ultrasound data in the elevation dimension as a function of axial position.

In yet another embodiment, a method for processing ultrasound data in the elevation dimension is provided. A set of complex ultrasound data associated with elevation, axial and azimuthal positions is generated. The complex ultrasound data is adjusted along the elevation dimension for each of a plurality of axial and azimuthal positions as a function of a phase of the complex ultrasound data in the elevation dimension at a respective axial position.

Further aspects and advantages of the invention are discussed below in conjunction with the preferred embodiments.

DETAILED DESCRIPTION OF PREFERRED EMBODIMENTS

Figure 1:
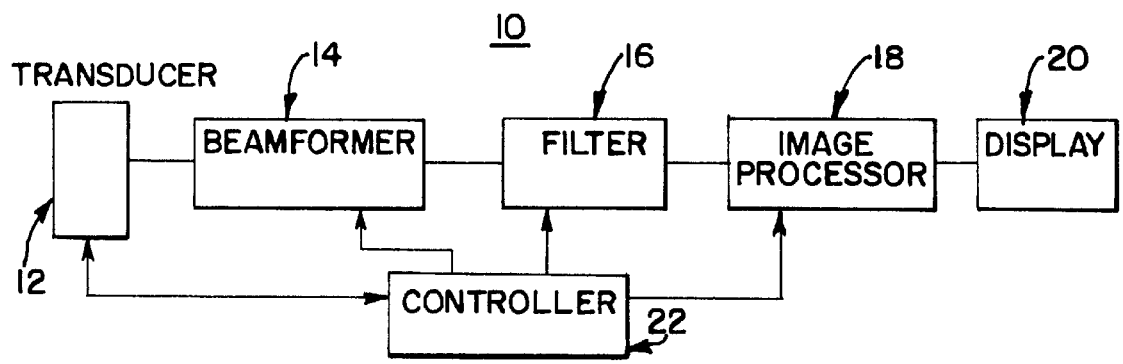
FIG. 1 is a block diagram of one embodiment of an ultrasound system for synthetic aperture processing in elevation.

In the preferred embodiments discussed below, elevation resolution is improved through coherent processing of in-phase and quadrature image data in elevation at each axial and azimuthal location. For coherent processing, a range varying complex filter is convolved with the complex data to refocus the elevation beam. The coefficients of the complex filter are determined by the geometry or shape of the acoustic lens design in the elevation dimension, the depth of interest (i.e., axial position), and the transducer elevational location and orientation of at least two elevationally spaced data sets. After elevation refocusing, the complex in-phase and quadrature data is detected and processed to generate a two-dimensional or three-dimensional rendering.

One embodiment of an ultrasound system for performing the synthetic aperture processing in the elevation dimension as discussed above is generally shown in FIG. 1 at 10. The ultrasound system 10 includes a transducer 12, a beamformer 14, a filter 16, an image processor 18 and a display 20 connected in an ultrasound data processing path. A controller 22 controls the ultrasound data processing path.

The transducer 12 comprises a curved linear, linear or other one dimensional transducer. In alternative embodiments, the transducer 12 comprises a two-dimensional transducer or other multi-dimensional transducers. For example, the multi-dimensional transducer disclosed in U.S. application Ser. No. 08/916,585, filed Aug. 22, 1997, the disclosure of which is incorporated herein by reference, is used.

For one-dimensional transducers, the transducer 12 preferably includes structure for measuring the elevation position of the transducer. For example, the transducer 12 may be placed in various elevation positions in a frame; the transducer 12 is motorized to provide an evenly spaced sweep or rotation in elevation position; or the transducer includes LEDs or other devices for indicating a proper elevation position. Other elevation positioning or measuring devices may be used, such as magnetic positioners or by using ultrasound data itself For using ultrasound data, speckle correlation or de-correlation (i.e., an amount of correlation) may be used for elevation positioning.

The transducer 12 is used to obtain information associated with a plurality of elevationally spaced two-dimensional regions for elevational filtering. For a given elevational position of the transducer 12, acoustic energy is transmitted and received in a two-dimensional plane defined by axial and azimuth dimensions. In response to signals from the controller 22, the beamformer 14 causes the transducer 12 to transmit acoustic energy waveforms along a plurality of scan lines within the two-dimensional plane. The scan lines are azimuthally arranged in one of various formats, such as linear, curved linear, sector, vector or other formats. Acoustic energy reflected from various depths or axial positions along each scan line is received by the transducer 12. The reflected acoustic energy represents the two-dimensional plane.

Figure 2:
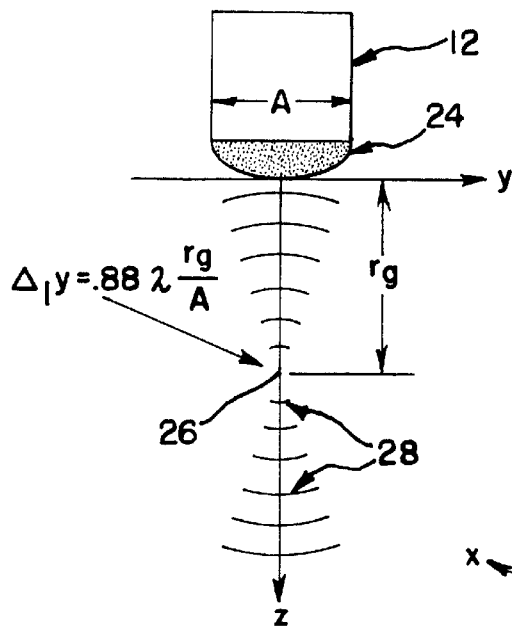
FIG. 2 is a schematic diagram of one embodiment of a linear transducer and an associated beam width in the elevation dimension.

Referring to FIG. 2, one embodiment of the linear transducer 12 and an associated elevational beam width of the two-dimensional plane is shown. The transducer 12 includes an acoustic lens 24 or curved transducer and filler. The shape of the acoustic lens 24 determines the elevational focal point 26. The elevation focal point 26 is at an axial position or depth $r_g$ from the transducer 12. The elevational width, A, of the acoustic lens 24 defines an elevational aperture. As represented by lines 28, the elevation beam width is the most narrow at the elevation focal point 26 and the least narrow adjacent the transducer 12 and at the axial position farthest from the transducer 12.

The −6 dB elevation resolution associated with transducer 12 for acoustic energy travelling one-way, such as away from the transducer 12, is equal to $$.88\lambda \frac{r_g}{A}$$

where $\lambda$ is the wavelength of the transmitted acoustic waveform. The two-way resolution is given by $$\Delta_2 y = .64\lambda \frac{r_g}{A} \tag{1}$$

Using the wave representation $$e^{j\omega t - jkR(x,y,z)} \tag{2}$$

where R is the path length to the target, x,y,z are the azimuth, elevation and range, and assuming the two-dimensional plane and elevation plane responses are separable, the elevation field pattern is approximated as:

$$s(y,z) \approx e^{-jkz} \int_{-A/2}^{+A/2} e^{j\frac{ky'^2}{2r_g}} e^{-j\frac{k(y-y')^2}{2z}} dy' \tag{3}$$

where k is the wave number ($2\pi/\lambda$). For axial positions away from the elevation focal point 26, the beam width is broad and has an approximate quadratic phase variation as a function of elevation position y.

Referring to FIG. 1, signals responsive to the echo data associated with the elevation beam discussed above are provided to the beamformer 14. The beamformer 14 applies various delays to the signals. The delayed signals are summed to form coherent ultrasound data. The coherent ultrasound data is represented by complex numbers, such as in-phase and quadrature data. The coherent data represents the two-dimensional plane and is associated with the elevation resolution discussed above.

The coherent ultrasound data is stored in the beam former 14 or filter 16 prior to synthetic aperture processing. Preferably, a memory, such as a RAM or a hard disk, is used. Various approximations or compression algorithms may be used to reduce the amount of storage required.

To refocus the elevation beam width (i.e., synthetically process the elevation aperture), coherent data associated with a plurality of two-dimensional planes defined by the azimuth and axial dimensions is obtained. The controller 22 receives position information from motion processing or sensors, such as magnetic or other sensors attached to the transducer 12, and measures the position and orientation of the transducer 12. For each two-dimensional plane, the transducer 12 is translated or rotated to a different elevation position. The two-dimensional planes are preferably separated in elevation by a spacing of one-half or less of the most narrow two-way elevation beam width. For example, the most narrow two-way elevation beam width is at the elevation focal point 26 of FIG. 2. Other elevation spacings may be used.

Decreased resolution in the near and far fields is corrected by filtering in the elevation dimension. The filter 16 comprises a processor with software for implementing the filtering or a hardware device, such as a finite impulse response (FIR) filter. Other hardware devices or filters may be used. The filter 16 synthetically processes the aperture in the elevation dimension to refocus the elevation beam.

Figure 3:
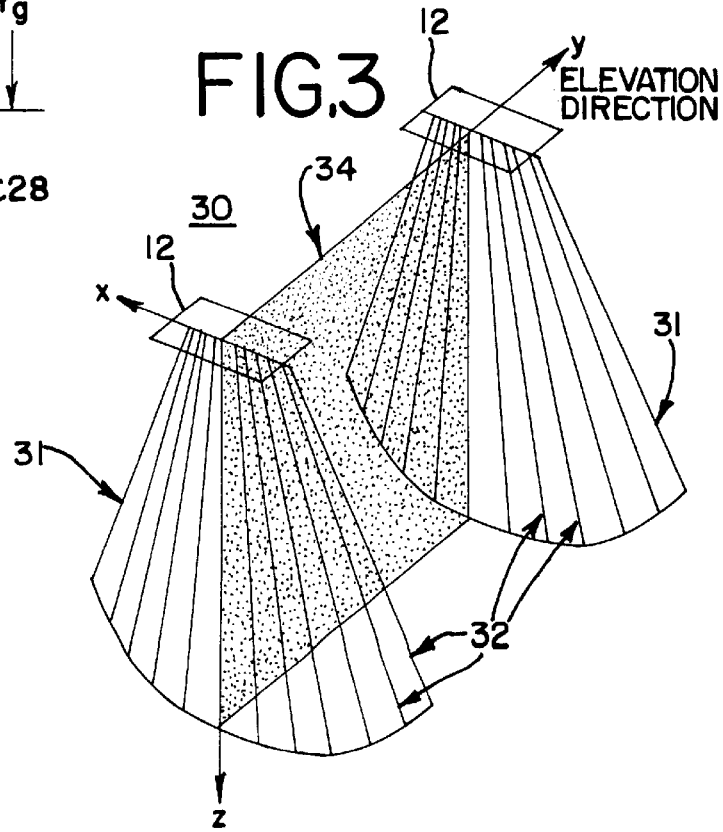
FIG. 3 is a graphical representation of a linear transducer and associated scan lines translated in an elevation dimension to define a plurality of elevational by axial planes.

Referring to FIG. 3, a graphic representation of the arrangement of the coherent data for synthetic aperture processing in the elevation dimension is represented generally at 30. For each elevation position of transducer 12, a scan line 32 is swept along the azimuth dimension. The sweep defines the two-dimensional plane 31. The elevation response along each scan line 32 is represented in FIG. 2. For each azimuth position of the ultrasound line 32, a processing plane 34 is generated in the elevation dimension as a function of the elevational position of the transducer 12.

Considering each of the processing planes 34 as a scene to be imaged using synthetic aperture processing, the variable width focused aperture in elevation is synthesized to compensate for defocusing of the elevation beam away from the elevation focal point 26. For each processing plane 34, the axially varying filter 16 (FIG. 1) filters the coherent ultrasound data along the elevation dimension. The filtering process varies as a function of the axial position to account for the axially varying beam width and associated oversampling. The filtering is also responsive to the elevational spacing of the transducer 12 to account for an amount of oversampling. The filtering refocuses the elevation beam.

By determining a mathematical representation of the processing plane and a magnitude and phase response of the elevation beam, a spectral focusing function for synthetic aperture processing is determined. Treating the two-dimensional axial and azimuth plane and elevation resolutions separately, the processing plane (i.e., elevation and depth dimensions) for a linear scan format is represented mathematically as:

$$q_i(x_{oi}, y, z) \approx \int_{-L/2}^{L/2} \overline{\sigma}(x_{oi}, y', z) g(y - y', z) dy', \quad (4)$$

where $\sigma$ is the xz (i.e., azimuth and axial) convolved response with $\sigma$—the scatter distribution, $X_{oi}$ is the position of the i-th scan line origin, and $g=s^2$. s is represented by Equation 3 and represents the two-way elevation response. For the general case of a steered scan line format:

$$q_i(x_{oi}, y, r, \theta_i) \approx \int_{-L/2}^{L/2} \overline{\sigma}(x_{oi}, y', r, \theta_i) g(y - y', r) dy' \quad (5)$$

$$\text{where } r = \sqrt{z^2 + (x - x_{oi})^2}$$

where $\theta$ is the angle of each scan line in the xz two-dimensional plane, and r is the distance or axial position along the scan line in the xz two-dimensional plane. The steering of the scan lines introduces an additional linear phase component across the azimuth aperture, tilting the elevation response. Equation 5 may be applicable for vector, sector, curved linear or any other arbitrary scan line format.

Solving for the elevational field pattern of Equation 3, two equations are generated, one for near the elevational focal point and another approximating the function g away from the elevational focal point:

$$g(y, z) \approx e^{-2jkz} e^{\frac{-jky^2}{(r_g - z)}} \pi \left( \frac{r_g y}{(r_g - z)A} \right) \quad z \neq r_g \quad (6)$$

$$g(y, z) = e^{-2jkr_g} e^{\frac{-jky^2}{r_g}} \text{sinc}^2 \left( \frac{Ay}{\lambda r_g} \right) \quad z \approx r_g$$

where Π represents the Rect function. The approximation for axial positions away from $r_g$ may be derived from geometric construction, and the function g (y,z) at the focus $r_g$ is the defraction limited response at $r_g$.

Figure 4:
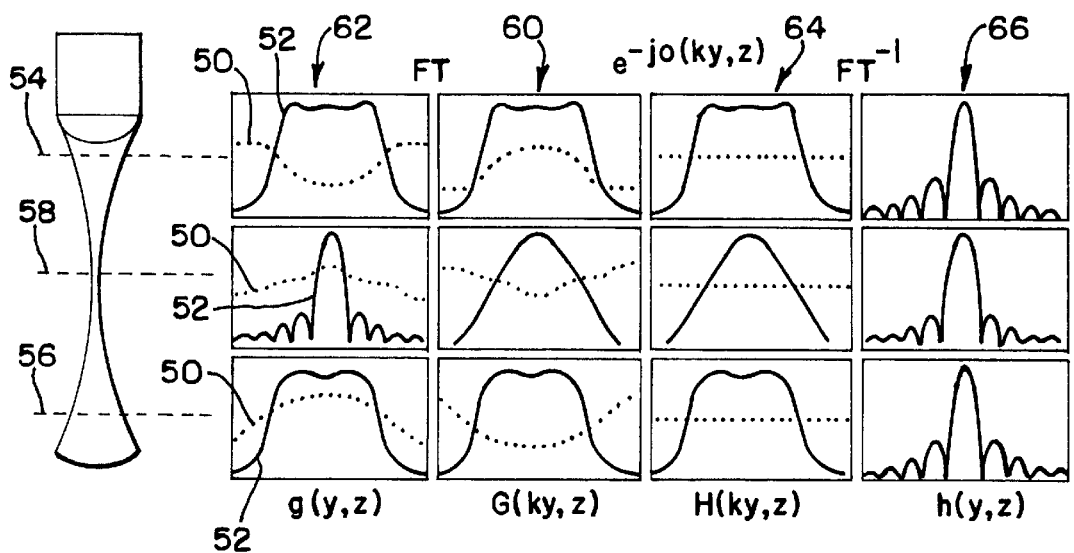
FIG. 4 is a graphical representation of one embodiment for synthetic aperture processing in elevation showing phase and magnitude differences as a function of axial position through various filtering steps.

Referring to FIG. 4, the magnitude and phase response associated with Equation 6 is shown at 52 and 50 respectively, for the near field and far field axial positions 54 and 56. The magnitude and phases are associated with a wide elevation beam width. For an elevational focal point axial position 58, the magnitude and phase 52 and 50 are associated with a more narrow elevation beam width. The phase 52 in the near field and far field positions 54 and 56 represents quadratic phase variation.

Figure 5:
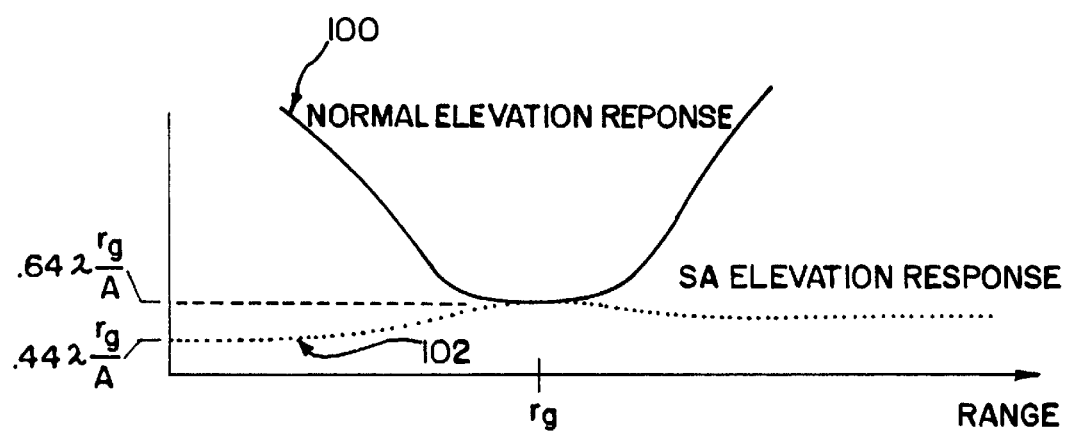
FIG. 5 is a graph showing elevation response before and after synthetic aperture processing in elevation.

To refocus the elevation beam patterns, the phases 50 for each axial position 54, 56, 58 and any other axial positions at each azimuth position are aligned. The phases are aligned by adding or subtracting an opposite phase and coherently summing over the active elevation aperture. The active elevation aperture is the elevation beam width. As represented in FIG. 5, the wider the beam width prior to phase alignment, the narrower the beam width after synthetic aperture processing. The normal elevation response is shown by line 100 as a function of axial position or range. The two-way elevational response after synthetic aperture processing in the elevation dimension is represented by line 102. As the normal elevation response narrows near the elevation focal point $r_g$, less active elevation aperture is available for synthetic aperture processing. Therefore, the synthetic aperture processed elevation response 102 is less improved near the elevation focal point $r_g$. In alternative embodiments, an additional steering phase component may be added in addition to the phase alignment, so as to steer the elevation beam.

The responses at a finite number of axial positions may be pre-computed for the complex conjugate of the elevation impulse response and used in a matched filtering process on the coherent ultrasound data. This matched filtering process is represented by $$q_i^{SA}(x_{oi}, y, r, \theta_i) = \int_{-L/2}^{L/2} g^*(y - y'', r) q_i(x_{oi}, y'', r, \theta_i) dy'', \quad (7)$$

where * is the complex conjugate and y" varies in the elevation dimension. The impulse response after synthetic aperture processing is represented, inserting Equation 5 into Equation 7 and performing the convolution of g and g* for the depth of interest, as:

$$q_i^{SA}(x_{oi}, y, r, \theta_i) = \int_{-L/2}^{L/2} h(y - y', r) \overline{\sigma}_i(x_{oi}, y', r, \theta_i) dy', \quad (8)$$

where the convolution of g and g* are represented by h (y,r). The matched filtering corresponds to application of the spectral focusing function to the coherent ultrasound data.

Alternatively, the synthetic aperture processing in the elevation dimension is performed in the frequency domain. In one embodiment, the two-way focused propagation Green's function $G(k_y, r)$ is used as a filter. The two-way elevation field pattern of the coherent data is Fourier transformed to the frequency domain, a phase alignment or spectral focusing function is applied, and the result is inverse Fourier transformed. The result is a refocused elevation beam.

The convolution h (y,r) and the two-way elevation response g (y,r) may be computed numerically and solved approximately in the near field and far field and solved at the elevation focal point using Fourier transforms. Referring to FIG. 4, the column 60 represents the Fourier transform G ($k_y$,z) of the magnitude and phase 50 and 52 of the elevation response g (y,z) in column 62. Mathematically, the Fourier transform of G ($k_y$,z) in Equation 6 is represented as:

$$G(k_y, z) \approx e^{-2jkz} \frac{e^{-j(r_g-z)k_y^2}}{4k} \pi\left(\frac{r_g k_y}{2kA}\right) \quad z \neq r_g \quad (9)$$

$$G(k_y, z) \approx e^{-2jkr_g} \Lambda\left(\frac{r_g k_y}{2kA}\right), \quad z \approx r_g$$

where $\Lambda$ is the triangle function. If a matched filter is used, the response H($k_y$,z) is represented by GG*. In order to maximize spatial bandwidth, let H($k_y$,z)=Ge$^{-j\angle G}$ which realigns or adjusts the phase. In FIG. 4, column 64 demonstrates the adjusted phase component. The Fourier transformed data is multiplied by the spectral focusing function e$^{-j\angle G}$. The result of adjusting the phase is represented as $$H(k_y, z) \approx \pi\left(\frac{r_g k_y}{2kA}\right) \quad z \neq r_g \quad (10)$$

$$H(k_y, z) \approx \Lambda\left(\frac{r_g k_y}{2kA}\right) \quad z \approx r_g$$

The data resulting from the phase alignment is inverse Fourier transformed as represented in column 66 of FIG. 4 and mathematically as:

$$h(y, z) \approx \text{sinc}\left(\frac{2Ay}{\lambda r_g}\right) \quad z \neq r_g \quad (11)$$

$$h(y, z) \approx \text{sinc}^2\left(\frac{Ay}{\lambda r_g}\right) \quad z \approx r_g$$

The −6 dB elevation beam width is given by $$\delta y = .44\lambda \frac{r_g}{A} = .44\lambda F_e \quad z \neq r_g$$

$$\delta y = .64\lambda \frac{r_g}{A} = .64\lambda F_e \quad z \approx r_g$$

where $F_e$ is the elevation F number (i.e., elevation focal range divided by the aperture size). Referring to FIG. 5, the −6 dB elevation resolution is graphically represented by line 102. For ranges greater than the elevation focal point $r_g$, the synthetic aperture processing elevation width is larger than for ranges shallower than the elevation focal point $r_g$. This difference is a result of the two-way far field response g having been self-apodized due to the amplitude of the actual diffraction pattern and the amplitude different than the II function used in the approximation given by Equation 6. This residual range dependence of the synthetic aperture elevation resolution may be partially compensated by enhancing the attenuated higher spatial frequency components in the frequency domain when performing the phase alignment. However, this further compensation may increase the noise content at deeper depths.

The data resulting from the synthetic aperture processing in the elevation dimension is output by the filter 16 to the image processor 18. This higher elevation resolution data is detected and scan converted in the image processor 18. For two-dimensional imaging, the image processor 18 outputs data representing an imaging plane in the azimuth and axial dimensions. The data associated with one or the plurality of two-dimensional planes is output by the filter 16. The image processor 18 selects one plane or spatially combined planes for imaging.

For three-dimensional imaging, the image processor 18 generates a representation of the three-dimensional scanned region. Using the data representing three dimensions output by the filter 16, various 3-D processes are used, such as surface shading, maximum intensity projection or another process. In alternative embodiments, an arbitrarily-oriented plane within the three-dimensional scanned region is selected for imaging. Data is interpolated to the arbitrarily-oriented plane and output for display.

The two-dimensional or three-dimensional imaging data is output to the display 20. Due to the synthetic aperture processing in the elevation dimension, the two-dimensional or three-dimensional representation on the display 20 has improved elevation resolution.

In alternative embodiments, methods using correlation of image data for determining the elevation position and orientation of the transducer 12 are used. As the frequency of the transmitted waveforms increases, the wavelength decreases. Position sensors on a transducer may be insufficient for optimal elevation refocusing at very small wavelengths. In these embodiments, a transducer comprising multiple oriented arrays, such as disclosed in U.S. application Ser. No. 08/916,585 is used. The transducer uses correlations between image blocks to determine a position and orientation. The accuracy of image data-based correlation techniques scales as a function of the transmit waveform frequency. As the frequency is increased, the intrinsic accuracy of the correlation techniques also increases.

In yet another alternative embodiment, the elevation refocusing discussed above is used with a piano concave transducer. The elevational thickness of a piano concave transducer varies, such as having a concave shape, in the elevation dimension. The frequency response of the transducer varies in the elevational dimension based on the thickness, producing a narrower elevation beam. The synthetic aperture processing in the elevation dimension discussed above may be used to further enhance the elevation resolution of a system using a piano concave transducer.

The elevation refocusing discussed above may be applied in harmonic imaging. In harmonic imaging, acoustic waveforms are transmitted at a fundamental frequency band ("the fundamental frequency") and received at a harmonic frequency band ("the harmonic frequency") of the fundamental frequency band. The harmonic frequency can be an integer or non-integer multiple of the fundamental frequency (i.e., 2nd, 3rd or 4th harmonic or 3/2, 5/2 or 7/2 harmonic), or a fraction of the fundamental frequency (i.e., 1/2 harmonic). The focusing functions discussed above for refocusing are similar. For example, if the 2nd harmonic is the harmonic of interest, the elevation transmit wavefield is approximately the square of the fundamental elevation transmit wavefield. This squaring does not change the overall phase behavior. The phase behavior is a function of the physical geometry (i.e., the phase is the same as transmitting a signal at the harmonic frequency of interest). The amplitude of the transmit wavefield is generally squared. Away from the elevation focus, this squaring does not alter the shape substantially-an approximate rectangular beam pattern stays approximately rectangular. Near the elevation focus, the squaring narrows the elevation transmit beam pattern. The 2nd harmonic elevation round-trip response can be shown to be approximately:

$$g(y, z) \approx e^{-2jkz} e^{\frac{jky^2}{(r_g-z)}} \pi\left(\frac{r_g y}{(r_g - z)A}\right) \quad z \neq r_g \quad (12)$$

-continued $$\lambda@harmonic \quad g(y, z) = e^{-2jkr_g} e^{\frac{-jky^2}{r_g}} \mathrm{sinc}^2\left(\frac{Ay}{\lambda r_g}\right) \mathrm{sinc}\left(\frac{Ay}{\lambda r_g}\right) \quad z \approx r_g$$

$$k = \frac{2x}{\lambda}$$

To refocus the elevation beam pattern, the phase alignment discussed above with regard to equation 6 is performed using these equations for harmonic processing.

The imaging techniques and systems described herein may be used for both tissue and contrast agent imaging. In contrast agent imaging, any one of a number of well-known contrast agents, such as microspheres, are added to the target in order to enhance the response of tissue or fluid. Contrast agents radiate ultrasound energy at a harmonic and/or at the fundamental frequency.

In tissue imaging, no additional contrast agent is added to the target, and only the characteristics of the tissue or fluid are relied on to create the ultrasonic image. Medical ultrasound imaging is typically conducted in a discrete imaging session for a given subject at a given time. For example, an imaging session can be limited to an ultrasound patient examination of a given tissue of interest over a period of one quarter to one hour, though other durations are possible. In this case, no additional contrast agent is introduced into the tissue at any time during the imaging session. Tissue imaging may be provided using either fundamental or harmonic imaging.

The synthetic aperture processing discussed above may be used with any of various ultrasound waveform transmission techniques. For example, one or more simultaneously transmitted coded (e.g. chirp) or uncoded waveforms may be used. U.S. Pat. No. 5,014,712 discloses one technique using coded waveforms. See also U.S. application Ser. No. 09/282, 510 (Attorney Ref. No. 5050/512), filed herewith.

Another transmission technique provides for alternate line phasing, such as disclosed in U.S. application Ser. No. 09/198,219, filed Nov. 23, 1998, the disclosure of which is incorporated herein by reference. See also U.S. application Ser. No. 09/282,396 (Attorney Ref No. 5050/542), filed herewith. Spatially separate transmit beams are fired with alternating phase between lines along the azimuth and elevation dimensions. Data representing the received beams are summed along the elevation dimension for fundamental component rejection and for synthetic aperture processing as discussed above. The summation includes real filtering for fundamental rejection and complex filtering for synthetic aperture processing.

While the invention has been described above by reference to various embodiments, it will be understood that many changes and modifications can be made without departing from the scope of the invention. For example, different filter hardware may be used. Different two-dimensional or three-dimensional image processing methods may be used for generating an image.

It is therefore intended that the foregoing detailed description be understood as an illustration of the presently preferred embodiments of the invention, and not as a definition of the invention. It is only the following claims, including all equivalents, that are intended to define the scope of this invention.

What is claimed is:

1. A method for processing ultrasound data in an elevation dimension, the method comprising the steps of:
    (a) generating at least first and second sets of coherent ultrasound data with a one-dimensional transducer array producing a mechanically focused wavefront, each set of coherent ultrasound data defining axial and azimuthal dimensions, the first set of coherent ultrasound data associated with a different elevation position than the second set of coherent ultrasound data; and
    (b) filtering coherent ultrasound data from the at least first and second sets of data in the elevation dimension as a function of an axial position.

2. The method of claim 1 wherein step (a) comprises generating the at least first and second sets of in-phase and quadrature data.

3. The method of claim 1 wherein step (b) comprises adjusting a phase associated with the coherent ultrasound data in the elevation dimension for each of a plurality of axial positions.

4. The method of claim 1 further comprising:
    (c) transmitting ultrasonic energy associated with a wavelength;
    wherein step (a) comprises generating the first and second sets associated with first and second elevation positions, respectively, the first and second elevation positions having a difference less than one half of a two-way elevation beamwidth.

5. The method of claim 4 further comprising:
    (d) determining the first and second elevation positions as a function of an amount of correlation between the first and second sets; and
    wherein step (b) is responsive to the first and second elevation positions.

6. The method of claim 1 further comprising:
    (c) generating an image responsive to step (b) and representing three dimensions.

7. The method of claim 1 further comprising:
    (c) generating an image responsive to step (b) and representing two dimensions.

8. The method of claim 1 wherein step (b) comprises filtering the coherent ultrasound data for at least axial positions different than a range of positions near an elevation focal point.

9. The method of claim 1 wherein step (b) comprises refocusing an elevation beam.

10. The method of claim 1 wherein step (b) is responsive to a shape in the elevation dimension of an elevation beam.

11. The method of claim 1 wherein step (b) comprises:
    (b1) Fourier transforming the coherent ultrasound data;
    (b2) multiplying data responsive to step (b1) by a spectral focusing function; and
    (b3) inverse Fourier transforming data responsive to step (b2).

12. An ultrasound apparatus for processing ultrasound data in an elevation dimension comprising:
    a one-dimensional transducer producing a mechanically focused wavefront;
    a beamformer operatively connected to the transducer for generating at least first and second sets of coherent ultrasound data, each set of coherent ultrasound data defining axial and azimuthal dimensions, the first set of coherent ultrasound data associated with a different elevation position than the second set of coherent ultrasound data; and
    a filter for filtering coherent ultrasound data from the at least first and second sets of data in the elevation dimension as a function of an axial position.

13. The apparatus of claim 12 wherein the filter comprises an axial varying filter for adjusting a phase associated with the coherent ultrasound data in the elevation dimension for each of a plurality of axial positions.

14. The apparatus of claim 12 further comprising:
a processor for determining first and second elevation positions for the first and second sets, respectively, as a function of an amount of correlation between the first and second sets; and
wherein the filter is responsive to the first and second elevation positions.

15. The apparatus of claim 12:
further comprising a transducer having an acoustic lens and operatively connected to the beamformer, the acoustic lens comprising an elevation dimension shape;
wherein the filter is responsive to the elevation dimension shape.

16. The apparatus of claim 12 wherein the filter is operable to:
(b1) Fourier transform the coherent ultrasound data,
(b2) multiply data responsive to (b1) by a spectral focusing function; and
(b3) inverse Fourier transform data responsive to (b2).

17. The apparatus of claim 12 wherein the filter comprises a processor for applying a software process.

18. The apparatus of claim 12 wherein the filter comprises a finite impulse response filter.

19. A method for processing ultrasound data in an elevation dimension, the method comprising the steps of:
(a) generating a set of complex ultrasound data associated with elevation, axial and azimuth positions with a one-dimensional transducer providing a mechanically focused wavefront; and
(b) adjusting the complex ultrasound data in the elevation dimension for each of a plurality of axial and azimuth positions as a function of a phase associated with the complex ultrasound data in the elevation dimension at the respective axial position.

20. The method of claim 19 further comprising:
(c) determining an elevation spacing associated with the complex ultrasound data as a function of a correlation between axial and azimuth planes of the complex ultrasound data; and
wherein step (b) is responsive to the elevation spacing.

21. The method of claim 19 wherein step (b) comprises filtering the complex ultrasound data as a function of the axial position.

22. The method of claim 19 wherein step (b) comprises:
(b1) Fourier transforming the complex ultrasound data;
(b2) multiplying data responsive to step (b1) by a spectral focusing function, and
(b3) inverse Fourier transforming data responsive to step (b2).

23. A method for processing ultrasound data in an elevation dimension, the method comprising the steps of:
(a) generating at least first and second sets of coherent ultrasound data responsive to a harmonic frequency band of a fundamental transmit frequency band, each set of coherent ultrasound data defining axial and azimuthal dimensions, the first set of coherent ultrasound data associated with a different elevation position than the second set of coherent ultrasound data; and
(b) filtering coherent ultrasound data from the at least first and second sets of data in the elevation dimension as a function of an axial position.

24. The method of claim 23 wherein the at least first and second sets of coherent ultrasound data are generated using a one-dimensional transducer array comprising an acoustic lens.

25. The method of claim 23 further comprising:
(c) adding contrast agents prior step (a).

26. The method of claim 23 wherein the at least first and second sets of coherent ultrasound data represent a subject and are generated during an imaging session, the subject being free of added contrast agents during the entire imaging session.

* * * * *

UNITED STATES PATENT AND TRADEMARK OFFICE
CERTIFICATE OF CORRECTION

PATENT NO. : 6,132,375
DATED : October 17, 2000
INVENTOR(S) : David J. Napolitano It is certified that error appears in the above-identified patent and that said Letters Patent is hereby corrected as shown below:

Column 3,
Line 36, immediately after "itself" insert -- . -- (period).

Column 5,
Line 34, delete "$\sigma$" and substitute -- $\bar{\sigma}$ -- in its place.

Line 57, delete "$\dfrac{-jky^2}{(r_g - z)}$" (Equation (6), first occurrence) and substitute -- $\dfrac{jky^2}{(r_g - z)}$ -- in its place.

Line 64, delete "II" and substitute -- $\pi$ -- in its place.

Column 7,
Line 48, delete "II" and substitute -- $\pi$ -- in its place.

Column 8,
Lines 30, 31 and 38, delete "piano" and substitute -- plano -- in its place.

Column 9,
Line 4, delete "g(y,z) = e" and substitute -- g(y,z) $\approx$ e -- in its place, and delete "z $\approx$ r_g" and substitute -- z = r_g -- in its place.

Column 12,
Line 4, delete "," (comma) and substitute -- ; -- (semicolon) in its place.

Signed and Sealed this

Twenty-eighth Day of May, 2002

Attest:

*Attesting Officer*

JAMES E. ROGAN
*Director of the United States Patent and Trademark Office*